US011131289B2

(12) United States Patent
Hawkins et al.

(10) Patent No.: US 11,131,289 B2
(45) Date of Patent: Sep. 28, 2021

(54) MANUFACTURE OF A WIND TURBINE BLADE

(71) Applicant: Vestas Wind Systems A/S, Aarhus N. (DK)

(72) Inventors: Jason Hawkins, Isle of Wight (GB); Craig Field, Southampton (GB); Steve Wardropper, New Milton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/310,600

(22) PCT Filed: Jun. 14, 2017

(86) PCT No.: PCT/DK2017/050196
§ 371 (c)(1),
(2) Date: Dec. 17, 2018

(87) PCT Pub. No.: WO2018/001425
PCT Pub. Date: Jan. 4, 2018

(65) Prior Publication Data
US 2019/0178227 A1    Jun. 13, 2019

(30) Foreign Application Priority Data

Jun. 28, 2016   (DK) .......................... PA 2016 70464

(51) Int. Cl.
*F03D 1/06* (2006.01)
*B29C 70/52* (2006.01)
(Continued)

(52) U.S. Cl.
CPC ............ *F03D 1/0675* (2013.01); *B29C 65/48* (2013.01); *B29C 66/7212* (2013.01);
(Continued)

(58) Field of Classification Search
CPC .... F03D 1/0675; F03D 1/0683; F03D 1/0691; F03D 1/065; F03D 1/0658; F03D 1/0608;
(Continued)

(56) References Cited

U.S. PATENT DOCUMENTS 3,096,958 A  *  7/1963  Koontz .................. B29C 70/08
                                                244/123.3
4,113,910 A  *  9/1978  Loyd ................. B29C 66/43441
                                                428/162
(Continued)

FOREIGN PATENT DOCUMENTS

CN      104812554 A     7/2015
DK      201470750 A1   12/2015
(Continued)

OTHER PUBLICATIONS

Francesco Aymerich, "Composite materials for wind turbine blades: issues and challenges", (Jul. 2012), Presentation—Department of Mechanical, Chemical, and Materials Engineering University of Cagliari, Italy (Year: 2012).*

(Continued)

*Primary Examiner* — Woody A Lee, Jr.
*Assistant Examiner* — Brian Christopher Delrue
(74) *Attorney, Agent, or Firm* — Wood Herron & Evans LLP

(57) ABSTRACT

A shear web flange (36) for a shear web (32) of a wind turbine blade (18) is described. The flange (36) extends longitudinally and comprises a bonding surface (50) for bonding to an inner surface of a wind turbine blade (18). One or more protruding features (52a, 52b) protrude from the bonding surface (50). A method of making such a shear web flange (36) is also described as are a shear web (32) for a wind turbine blade (18), a wind turbine blade (18) and a method of making a wind turbine blade (18).

22 Claims, 7 Drawing Sheets

(51) Int. Cl.
  *B29D 99/00* (2010.01)
  *F03D 13/10* (2016.01)
  *B29C 65/48* (2006.01)
  *B29C 65/00* (2006.01)
  B29L 31/08 (2006.01)
  B29K 63/00 (2006.01)
  B29K 307/04 (2006.01)
  B29K 309/08 (2006.01)

(52) U.S. Cl.
  CPC .......... *B29C 70/52* (2013.01); *B29D 99/0028* (2013.01); *F03D 1/065* (2013.01); *F03D 13/10* (2016.05); B29K 2063/00 (2013.01); B29K 2307/04 (2013.01); B29K 2309/08 (2013.01); B29L 2031/085 (2013.01); F05B 2230/24 (2013.01); F05B 2230/60 (2013.01); F05B 2240/2212 (2013.01); F05B 2240/301 (2013.01); F05B 2280/6003 (2013.01); F05B 2280/6013 (2013.01); F05B 2280/6015 (2013.01); Y02E 10/72 (2013.01); Y02P 70/50 (2015.11)

(58) Field of Classification Search
  CPC .. F03D 13/10; F05B 2230/24; F05B 2230/60; F05B 2240/2212; F05B 2240/301; F05B 2280/6003; F05B 2280/6015
  USPC .......................................................... 416/233
  See application file for complete search history.

(56) References Cited

U.S. PATENT DOCUMENTS

| | | | | |
|---|---|---|---|---|
| 4,219,980 A * | 9/1980 | Loyd | B29C 65/562 | 52/309.1 |
| 4,331,723 A * | 5/1982 | Hamm | B29C 70/865 | 428/61 |
| 4,813,202 A * | 3/1989 | Anderson | B64C 1/12 | 244/131 |
| 5,476,704 A * | 12/1995 | Kohler | B29C 66/114 | 428/119 |
| 6,173,925 B1* | 1/2001 | Mueller | B64C 3/48 | 244/123.1 |
| 6,234,423 B1* | 5/2001 | Hirahara | B64C 3/18 | 244/123.7 |
| 6,374,570 B1* | 4/2002 | McKague, Jr. | B64C 1/064 | 52/762 |
| 6,676,882 B2* | 1/2004 | Benson | B29B 15/122 | 156/286 |
| 6,945,727 B2* | 9/2005 | Christman | B29C 66/43461 | 403/109.8 |
| 7,037,568 B1* | 5/2006 | Rogers | B29C 65/5057 | 244/131 |
| 7,244,487 B2* | 7/2007 | Brantley | B29C 65/561 | 244/123.7 |
| 7,574,835 B2* | 8/2009 | Bohlmann | B32B 1/00 | 114/85 |
| 7,690,164 B2* | 4/2010 | Walker | B29C 70/68 | 52/309.1 |
| 7,712,488 B2* | 5/2010 | Goering | B29C 70/222 | 139/384 R |
| 7,712,993 B2* | 5/2010 | Frisch | E04C 2/243 | 403/187 |
| 7,713,893 B2* | 5/2010 | Goering | B29B 11/16 | 442/246 |
| 8,235,671 B2* | 8/2012 | Yarbrough | F03D 1/0683 | 416/226 |
| 8,257,048 B2* | 9/2012 | Yarbrough | F03D 1/065 | 416/226 |
| 8,262,362 B2* | 9/2012 | Yarbrough | F03D 1/0683 | 416/226 |
| 8,356,982 B2* | 1/2013 | Larrea | F03D 1/0675 | 416/223 R |
| 8,393,871 B2* | 3/2013 | Yarbrough | F03D 1/0683 | 416/226 |
| 9,458,823 B2* | 10/2016 | Liu | F03D 1/0675 | |
| 9,537,443 B2* | 1/2017 | Sueda | F24S 25/13 | |
| 9,745,954 B2* | 8/2017 | Noronha | B29C 66/1122 | |
| D825,315 S * | 8/2018 | Inzeo | D8/349 | |
| 10,071,794 B2* | 9/2018 | Abe | B29C 65/48 | |
| 10,131,092 B1* | 11/2018 | Cook | A63G 31/12 | |
| 10,422,315 B2* | 9/2019 | Yarbrough | F03D 1/0675 | |
| 10,519,927 B2* | 12/2019 | Tobin | B29D 99/0028 | |
| 2007/0110584 A1* | 5/2007 | Stommel | F03D 1/0675 | 416/233 |
| 2010/0135815 A1* | 6/2010 | Bagepalli | F03D 1/0675 | 416/226 |
| 2010/0135817 A1* | 6/2010 | Wirt | F03D 1/0675 | 416/226 |
| 2010/0162567 A1* | 7/2010 | Kirkwood | B64C 3/28 | 29/897.2 |
| 2010/0276065 A1 | 11/2010 | Blanchard et al. | | |
| 2011/0008175 A1* | 1/2011 | Gau | B29C 65/5085 | 416/233 |
| 2011/0020129 A1* | 1/2011 | Larrea | F03D 1/0675 | 416/223 R |
| 2011/0142663 A1* | 6/2011 | Gill | F03D 1/0675 | 416/226 |
| 2011/0142674 A1* | 6/2011 | Dixon | F03D 1/0675 | 416/241 R |
| 2011/0176928 A1* | 7/2011 | Jensen | F03D 3/062 | 416/233 |
| 2011/0187115 A1* | 8/2011 | Piasecki | F03D 13/20 | 290/55 |
| 2012/0024457 A1 | 2/2012 | Ramm et al. | | |
| 2012/0027610 A1* | 2/2012 | Yarbrough | F03D 1/0683 | 416/226 |
| 2012/0027612 A1* | 2/2012 | Yarbrough | F03D 1/0683 | 416/226 |
| 2012/0027613 A1* | 2/2012 | Yarbrough | F03D 1/0683 | 416/226 |
| 2012/0027615 A1* | 2/2012 | Irizarry-Rosado | F03D 1/0683 | 416/226 |
| 2015/0308402 A1* | 10/2015 | Nielsen | B29C 66/1122 | 416/229 R |
| 2016/0102652 A1* | 4/2016 | Zuteck | F03D 1/0691 | 416/204 R |
| 2016/0319801 A1* | 11/2016 | Smith | B29C 70/547 | |
| 2017/0241401 A1* | 8/2017 | Smith | B29C 66/532 | |
| 2020/0080542 A1* | 3/2020 | Monie | B29D 99/0025 | |
| 2020/0332763 A1* | 10/2020 | Keohan | B29C 70/521 | |

FOREIGN PATENT DOCUMENTS

| | | |
|---|---|---|
| WO | 2015082404 A1 | 6/2015 |
| WO | 2016023555 A1 | 2/2016 |
| WO | 2016177375 A1 | 11/2016 |

OTHER PUBLICATIONS

Danish Patent and Trademark Office, Search and Examination Report in PA 2016 70464, dated Jan. 27, 2017.

European Patent Office, International Search Report and Written Opinion in PCT Application No. PCT/DK2017/050196, dated Sep. 29, 20178.

China National Intellectual Property Administration, First Notification of Office Action in CN Application No. 201780051295.7, dated Jul. 20, 2020.

* cited by examiner

MANUFACTURE OF A WIND TURBINE BLADE

FIELD OF THE INVENTION

The present invention relates generally to the manufacture of wind turbine blades, and more specifically to a shear web flange that improves the manufacture of wind turbine blades.

BACKGROUND TO THE INVENTION

Modern wind turbine blades typically comprise a hollow shell made up of two half-shells bonded together along leading and trailing edges of the blade. Two longitudinally-extending shear webs are typically provided inside the internal cavity of the blade. Each shear web comprises two longitudinally-extending mounting flanges that are bonded to opposed inner surfaces of the respective half-shells. As such, the shear webs bridge the two half-shells.

The shear webs are load-bearing components that serve to strengthen and stiffen the blade. It is therefore important that a strong bond is achieved between the mounting flanges of the shear webs and the inner surfaces of the half-shells as the integrity of the blade is dependent on the quality of the adhesion.

To bond a shear web mounting flange to the inner surface of a half shell, adhesive is applied to the inner surface of the half-shell along a predefined shear web mounting region extending longitudinally along the length of the blade. The shear web is then manoeuvred into position such that the bonding surface of the mounting flange is arranged against the adhesive. Thereafter, the shear web and half-shell are moved together to compress the adhesive between the bonding surfaces of the mounting flange and half-shell. The adhesive is then allowed to cure.

Compressing the adhesive is necessary to create a high-quality bond between the shear web and the half-shell. However, during compression some adhesive is squeezed out of the region between the bonding surfaces, thus reducing the thickness of the bondline. It can be difficult to control the compression of the adhesive and in some cases the adhesive may be compressed too far so that too much adhesive is squeezed out of the bondlines leaving insufficient adhesive in the bondlines between the blade shell and the mounting flanges of the shear webs. With insufficient adhesive in the bondlines, the mounting flanges of the shear web may have a tendency to flex against the blade shell resulting in a so-called 'kissing bond', which may be difficult to detect using non-destructive testing methods.

The present invention has been devised to mitigate or overcome at least some of the above-mentioned problems.

SUMMARY OF THE INVENTION

According to an aspect of the invention, there is provided a wind turbine shear web, the shear web having a flange. The flange extends longitudinally and comprises a bonding surface for bonding to an inner surface of a wind turbine blade. One or more protruding features protrude from the bonding surface.

The protruding features may prevent the bonding surface of the flange from approaching too close to the inner surface of a wind turbine blade to which the flange is to be bonded. In this regard, the protruding features may function as depth stops and may ensure that a minimum separation is maintained between the bonding surface and the inner surface of the wind turbine blade.

If adhesive is provided in the region between the bonding surface and the inner surface of the wind turbine blade, then the protruding features may prevent too much adhesive from being squeezed out of that region. Therefore, the protruding features may ensure a minimum thickness of adhesive is present in the bondline between the bonding surface and the inner surface of the wind turbine blade and hence ensure a high-quality bond.

The depth or height of the protruding features (i.e. the distance by which the features protrude from the bonding surface) is selected in dependence on the desired minimum thickness of adhesive between the bonding surface and the inner surface of the wind turbine blade. The protruding features may protrude from the bonding surface by approximately 0.5 to 5 mm. The protruding features preferably protrude from the bonding surface by approximately 2 to 3 mm.

The one or more protruding features may comprise one or more longitudinally extending ridges. The one or more protruding features may comprise a plurality of ridges that are mutually spaced apart in a lateral direction across the width of the flange. This advantageously ensures the stability of the flange when arranged against the inner surface of a wind turbine blade. A minimum thickness of adhesive is therefore ensured across the width of the flange.

The flange may comprise first and second peripheral ridges that are respectively laterally spaced inwardly of first and second longitudinal edge regions of the flange. The flange may comprise a central ridge located substantially centrally between first and second longitudinal edges of the flange. The central ridge may be configured to support the central portion of the flange and prevent the flange from flexing in the centre and forming a kissing bond.

An upstand may extend from a first surface of the flange opposite the bonding surface. The upstand may project from the centre of the first surface. The flange and the upstand may be substantially perpendicular. As such, the upstand and the flange together may be substantially T-shaped in cross-section. In other embodiments, the flange may be inclined relative to the upstand. This may allow the flange to accommodate an inclined blade surface.

The central ridge and the upstand may be laterally aligned with respect to the width of the flange. That is to say, the central ridge may be located directly opposite the upstand. Since force is generally transmitted to the flange via the upstand, the central ridge supports the portion of the flange that experiences the most force.

The protruding features may extend along substantially the entire length of the flange. The protruding features may be continuous along the length of the flange. The protruding features may have a constant cross-section along the length of the flange. The continuous and uniform nature of the protruding features along the length of the flange ensures that a minimum thickness of adhesive is maintained along the entire length of the bonding surface.

The one or more protruding features may be formed integrally with the flange. This advantageously minimizes the number of steps in the flange manufacturing process. In other embodiments, separate protruding features may be attached to the bonding surface of the flange.

The flange may be a pultruded component. A pultrusion process advantageously allows a flange of uniform cross-section (with protruding features of continuous, uniform cross-section) to be manufactured relatively quickly and inexpensively. Alternatively, the flange may be manufactured by another suitable process. For example, the flange may be a moulded component.

The flange may comprise reinforcing fibres in a cured resin matrix. The reinforcing fibres may be any suitable material, for example glass or carbon, and the resin matrix may comprise epoxy or other suitable resin. The flange may comprise fibres in any orientation. The protruding features may comprise unidirectional fibres. Use of unidirectional fibres for the protruding features advantageously simplifies the pultrusion process. A portion of the flange may comprise fibres oriented in more than one direction. For example, the remainder of the flange may comprise fibres predominantly arranged in three directions. This allows for efficient transfer of loads from the shear web to the surface to which the flange is to be bonded.

The flange may comprise a main portion defining the bonding surface and first and second longitudinal edge regions defining first and second longitudinal edges of the flange. The first and second longitudinal edge regions may have a reduced thickness relative to the thickness of the main portion. The reduced thickness of the longitudinal edge regions provides a volume between the inner surface of the blade shell and the flange. Any excess adhesive that is squeezed out when the flange is bonded to the inner surface of a wind turbine blade advantageously collects in this volume.

The shear web may comprise a longitudinally-extending web panel. The flange may be arranged transversely to the web panel. In some embodiments, the flange may be arranged perpendicularly to the web panel. In other embodiments, the flange may be inclined relative to the web panel to accommodate a curved or otherwise inclined profile of the inner surface of a wind turbine blade.

According to another aspect of the invention, there is provided a wind turbine blade comprising a shear web having a flange as described above. The flange may be bonded to an inner surface of the blade by means of adhesive. The bonding surface of the flange may be spaced apart from the inner surface of the blade with a layer of adhesive between the bonding surface of the flange and the inner surface of the blade. The one or more protruding features may be in contact with the inner surface of the blade.

According to a further aspect of the invention, there is provided a method of making a shear web having a flange as described above. The method comprises: providing a pultrusion die defining an aperture having a shape corresponding to a cross-sectional shape of the flange; drawing resin-coated fibrous material through the aperture; and curing the resin.

The fibrous material may comprise fibrous tape. The fibrous tape may include fibres in any orientation. The fibrous material preferably comprises fibrous tape in which the fibres are arranged predominantly in three directions: triax tape. The fibres of the triax tape may be oriented substantially at +45 degrees, −45 degrees and 0 degrees relative to the direction of pultrusion. Unidirectional tape may be drawn through the aperture in combination with triax tape to form the flange. As discussed above, the protruding features may be formed from unidirectional fibres and the remainder of the flange may comprise fibres oriented in more than one direction.

According to another aspect of the invention, there is provided a method of making a wind turbine blade. The method comprises: providing a shell portion of the wind turbine blade having an inner surface; providing a shear web having a flange as described above; applying adhesive to the inner surface of the shell portion and/or to the bonding surface of the flange; arranging the bonding surface of the flange opposite the inner surface of the shell portion; providing relative movement between the shear web and the shell portion such that the adhesive is squeezed between the inner surface of the shell portion and the bonding surface of the flange. The method may comprise continuing to provide said relative movement until the one or more protruding features make contact with the inner surface of the blade shell.

Providing relative movement between the shear web and the shell portion may comprise keeping the shell portion stationary whilst moving the shear web. Alternatively, providing relative movement between the shear web and the shell portion may comprise keeping the shell portion stationary whilst moving the shear web. In other embodiments, providing relative movement between the shear web and the shell portion may comprise moving the shear web and the shell portion simultaneously.

BRIEF DESCRIPTION OF THE DRAWINGS

In order that the invention may be more readily understood, embodiments of the invention will now be described by way of non-limiting example only with reference to the accompanying figures, in which.

DETAILED DESCRIPTION

Figure 1:
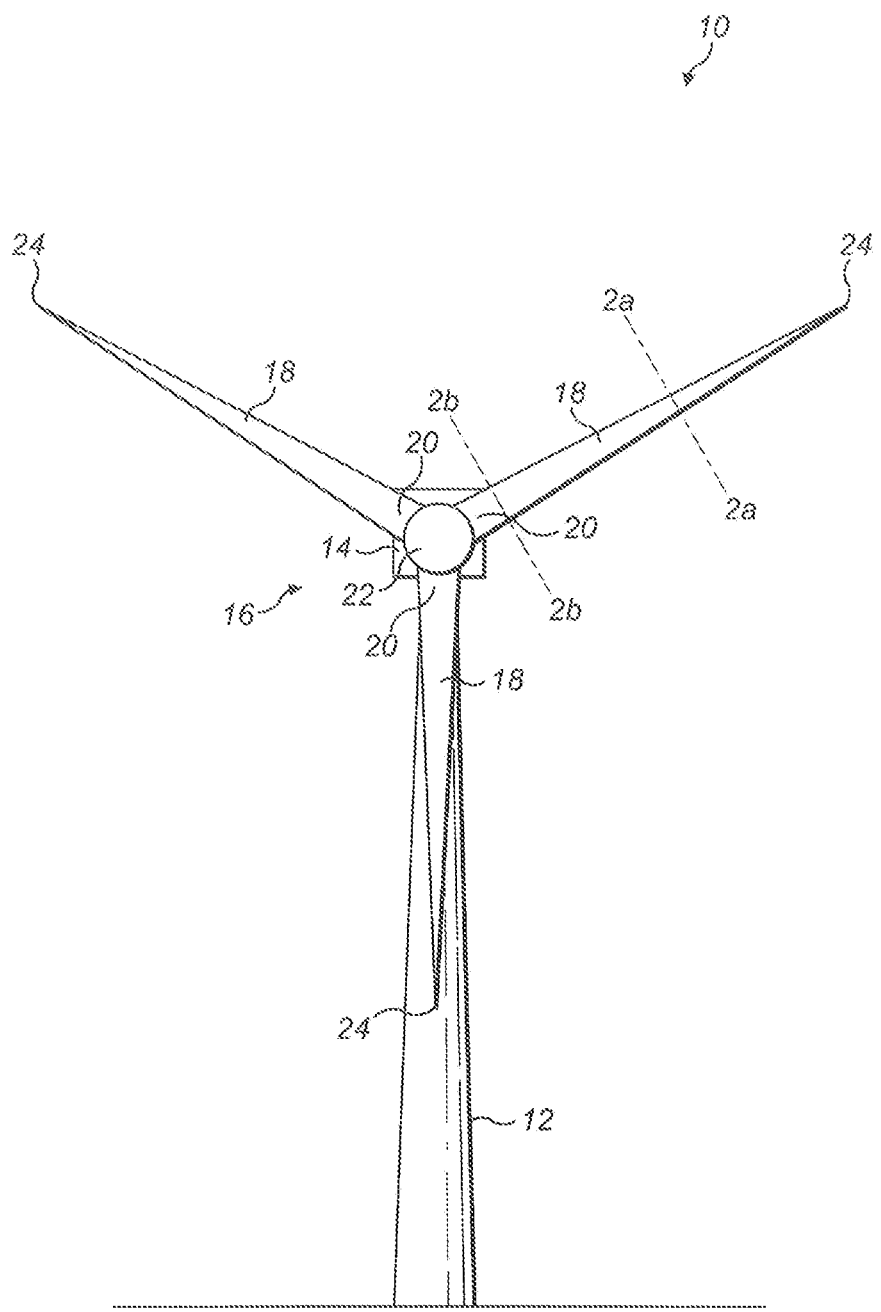
FIG. 1 is a schematic front view of a wind turbine comprising a plurality of blades.

Referring initially to FIG. 1, a wind turbine 10 according to an embodiment of the present invention is shown schematically. The wind turbine 10 comprises a tower 12 supporting a nacelle 14 to which a rotor 16 is mounted. The rotor 16 comprises a plurality of wind turbine blades 18 that extend radially from a root end 20, attached to a central hub 22, to a tip end 24. In this example, the rotor comprises three blades 18.

Figure 2A:
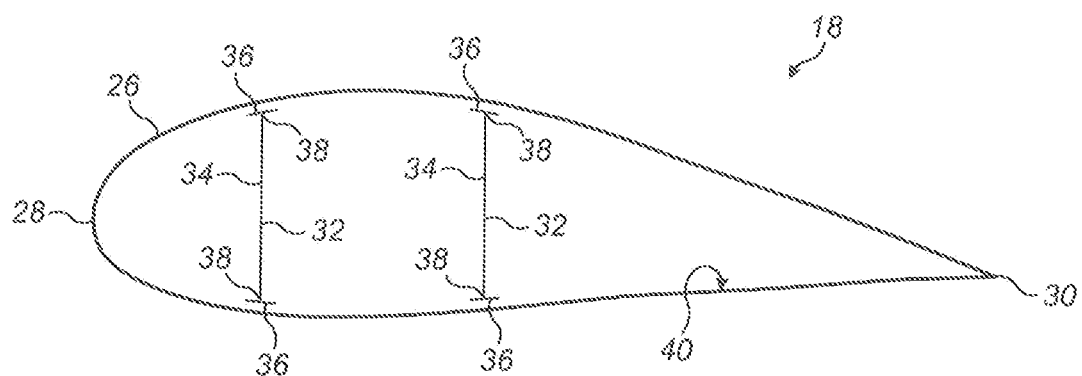
FIG. 2a is a schematic cross-sectional view of an airfoil portion of a wind turbine blade taken along the line 2a-2a in FIG. 1.

FIG. 2a shows a schematic cross-sectional view of an airfoil portion of a wind turbine blade 18 taken along the line 2a-2a in FIG. 1. The blade 18 may comprise a hollow shell 26 made up of two half-shells bonded together along the leading and trailing edges 28, 30 of the blade 18. Two shear webs 32 are located within the internal cavity of the blade 18. The shear webs 32 extend longitudinally along the length of the blade 18, transverse to the plane of the page.

In this example, each shear web 32 comprises a central web element 34 with two mounting flanges 36 respectively provided along first and second longitudinal edges 38 of the web element 34. As viewed in cross-section in the orientation shown in FIG. 2a, the mounting flanges 36 are respectively located at top and bottom edges 38 of a substantially vertical web element 34. As such, the shear webs 32 may be substantially I-shaped in cross-section. The mounting flanges 36 of each shear web 32 are bonded to the inner surface 40 of the shell 26.

Figure 2B:
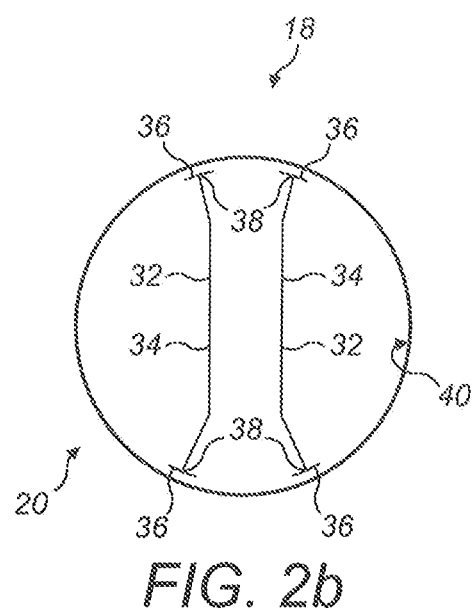
FIG. 2b is a schematic cross-sectional view of a circular root end of the wind turbine blade taken along the line 2b-2b in FIG. 1.

As will be readily apparent to persons skilled in the art, the profile of the wind turbine blade 18 may vary along its length. To accommodate the changing geometry of the shell 26 along the length of the blade 18, the shape of the shear webs 32 may vary along the length of the blade 18 depending upon the local profile of the blade 18. For example, FIG. 2b shows a schematic cross-sectional view of a circular root end 20 of the wind turbine blade 18 taken along the line 2b-2b in FIG. 1. In this example, the web elements 34 of the shear webs 32 are kinked to accommodate the high degree of curvature at the root end 20 of the blade 18.

Figure 3:
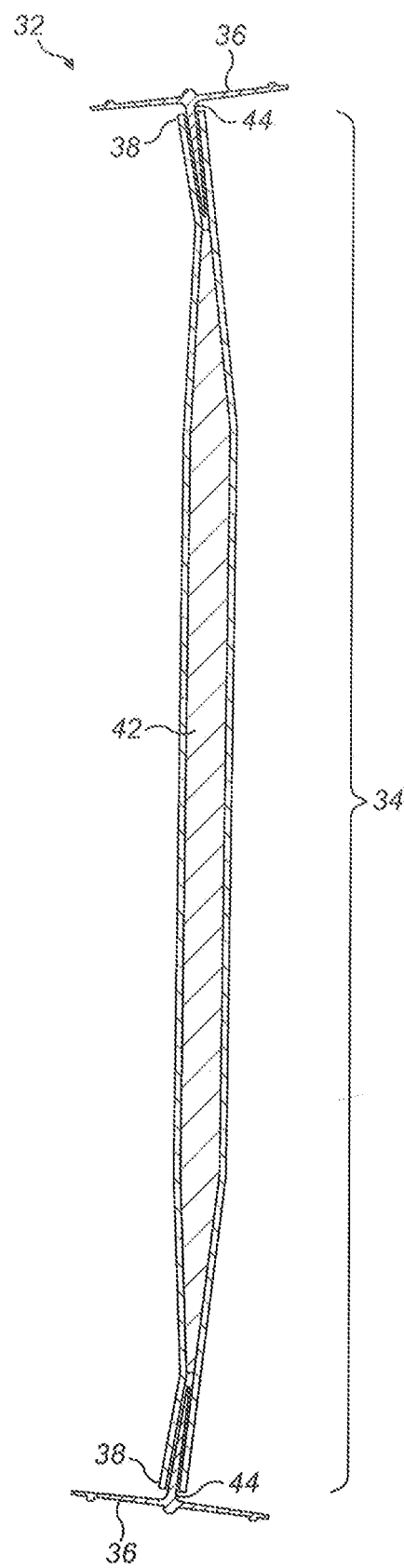
FIG. 3 is a cross-sectional view of a shear web comprising a web panel and two flange structures.

FIG. 3 shows a cross-sectional view of a shear web 32 suitable for the wind turbine blades 18 of FIG. 1. As shown in FIG. 3, the shear web 32 may be formed of three component sections: an elongate web panel 42 and first and second flange structures 44. In this example, the web panel 42 forms the web element 34 of the shear web 32 and the flange structures 44 form the respective mounting flanges 36. As will be described in more detail later, the flange structures 44 may be manufactured separately before being assembled into a layup that is cured to form the finished shear web 32.

The shear web 32 may be manufactured as a single unitary component extending along the length of the blade 18. Alternatively, the shear web 32 may comprise a plurality of longitudinal sections. For example, the shear web 32 may comprise a plurality of flange structures 44 arranged end-to-end along the length of the shear web 32 to define each mounting flange 36. In this case, each flange structures 44 may be substantially identical or may be dissimilar along the longitudinal extent of the shear web 32 to adapt to the changing geometry of the blade shell 26 along the length of the blade 18.

The flange structures 44 will now be described in more detail with reference to FIG. 4, which shows an enlarged cross-sectional view of one of the flange structures 44 in isolation. It should be noted that the cross-section of the flange structure 44 is uniform along its length in this example (where the length direction extends perpendicular to the plane of the page).

Figure 4:
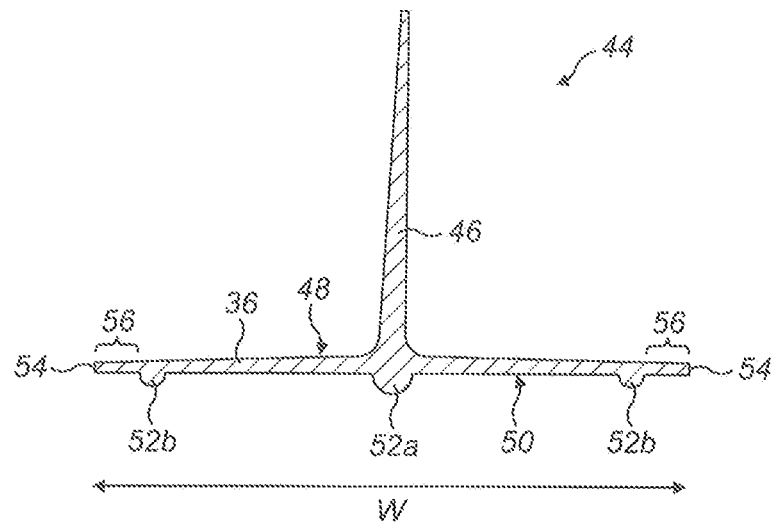
FIG. 4 is an enlarged cross-sectional view of a flange structure of the shear web.

As shown in FIG. 4, the flange structure 44 generally comprises a flange 36 and an upstand 46. In this example, the upstand 46 projects from the centre of a first or 'inner' surface 48 of the flange 36 in a substantially perpendicular direction. As such, the flange structure 44 is substantially T-shaped in cross-section. A second, or 'outer', surface 50 of the flange 36 (opposite to the surface 48 from which the upstand 46 projects) defines the bonding surface 50 of the flange 36. In the orientation of the flange structure 44 as shown in FIG. 4, the first surface 48 of the flange 36 is the upper surface of the flange 36 and the second surface 50 of the flange 36 is the lower surface of the flange 36. After the flange structure 44 has been assembled into a shear web, the bonding surface 50 may be bonded to the inner surface 40 (see FIG. 2a or 2b) of the blade shell 26, as will be described in more detail later.

The bonding surface 50 has a generally flat profile in this example. However, the flange 36 includes a plurality of features 52a, 52b that protrude from the bonding surface 50. In this example, the flange 36 includes three protruding features 52a, 52b in the form of ridges extending longitudinally and continuously along the length of the bonding surface 50. In this example, the protruding features 52a, 52b have constant cross-section along the length of the flange structure 44. In particular, the protruding features 52a, 52b in this example are approximately semi-circular in cross-section and protrude from the bonding surface 50 by approximately 2 to 3 mm. In other examples, the flange 36 may have other arrangements, numbers and/or sizes of protruding features.

As shown in this example, the protruding features 52a, 52b may be mutually spaced apart in a lateral direction across the width W of the flange 36. The three protruding features 52a, 52b comprise a central ridge 52a and two peripheral ridges 52b. The central ridge 52a is located centrally with respect to the flange 36, equidistant from first and second longitudinal edges 54 of the flange 36. As such, in this example, the central ridge 52a is directly opposite the upstand 46 extending from the upper surface 48 of the flange 36. In the orientation of the flange structure 44 shown in FIG. 4, the central ridge 52a is directly beneath the upstand 46. The peripheral ridges 52b are located either side of the central ridge 52a, laterally spaced apart from the central ridge 52a towards the respective longitudinal edges 54. The peripheral ridges 52b are laterally spaced inwardly of first and second longitudinal edge regions 56 of the flange 36.

The flange structure 44 may be a unitary component. Forming the flange structure 44 as a unitary component advantageously simplifies the manufacturing process of the flange structure 44. One method of manufacture will now be described with reference to FIG. 5.

In this example, the flange structure 44 is of composite construction and comprises a plurality of reinforcing fibres (such as glass fibres) embedded in a cured resin matrix. The flange structure 44 may be formed by pultrusion. As the skilled person will appreciate, this process may involve using an appropriately-shaped pultrusion die, such as the one shown in cross-section in FIG. 5.

Figure 5:
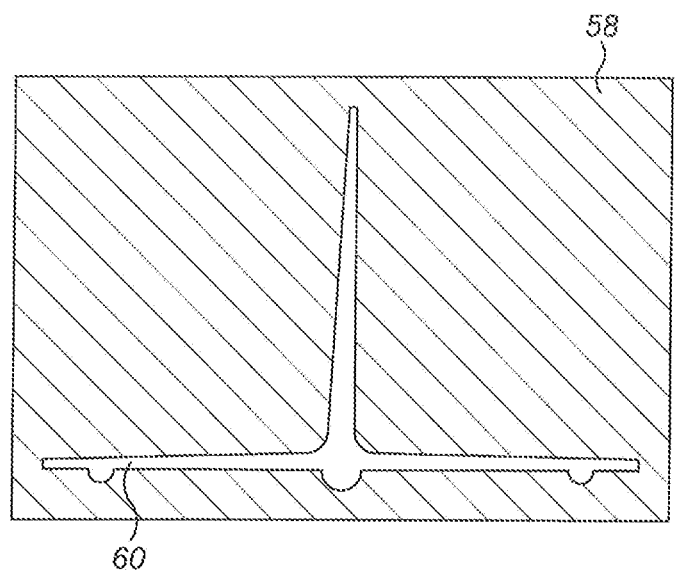
FIG. 5 is a schematic representation of a pultrusion die used in the manufacture of the flange structure.

As shown in FIG. 5, the pultrusion die 58 defines an aperture 60 having a shape corresponding to the cross-sectional shape of the flange structure 44. The pultrusion process may involve drawing resin-coated fibrous material through the aperture 60 of the pultrusion die 58 whilst curing the resin. This process advantageously allows a flange structure 44 of uniform cross-section, including continuous protruding features 52a, 52b of constant cross-section, to be produced easily and relatively inexpensively. However, it should be noted that a flange structure 44 of varying cross-section may be manufactured by varying the size of the aperture 60 or the angle of the pultrusion die 58 whilst fibrous material is drawn through the aperture 60.

The fibrous material drawn through the pultrusion die 58 may comprise fibre tape. In this case, the fibre tape may include fibres in any orientation. In preferred embodiments, triax tape is used in which the fibres are arranged predominantly in three directions which are respectively +45 degrees, −45 degrees and 0 degrees relative to the direction of pultrusion. In some embodiments, unidirectional tape may be drawn through the pultrusion die 58 in combination with the triax tape to form the flange structure 44. The flange 36 and the upstand 46 may comprise triax tape. The orientation of the fibres allows for efficient transfer of loads between the web panel 42 and the shell to which the flange structure is adhesively bonded. The protruding features 52a, 52b may comprise unidirectional fibres oriented at 0 degrees relative to the direction of pultrusion. The protruding features 52a, 52b are relatively small and it is simpler to draw unidirectional fibres though these small holes in the die rather than triax tape.

To manufacture the shear web 32, the flange structures 44 may be arranged in a mould along with the other shear web components, including the web panel components, to form a layup that is cured to form the shear web 32. The flange structures 44 are arranged such that in the finished shear web 32, the upstand 46 of each flange structure 44 forms the interface of the flange structure 44 with the web panel 42, as shown in FIG. 3. One example of an appropriate moulding process to manufacture the shear web 32 is described in the applicant's co-pending application number PCT/DK2016/050111.

A process for bonding the shear web 32 to the inner surface 40 of a blade shell 26 will now be described with reference to FIGS. 6a and 6b.

Figure 6A:
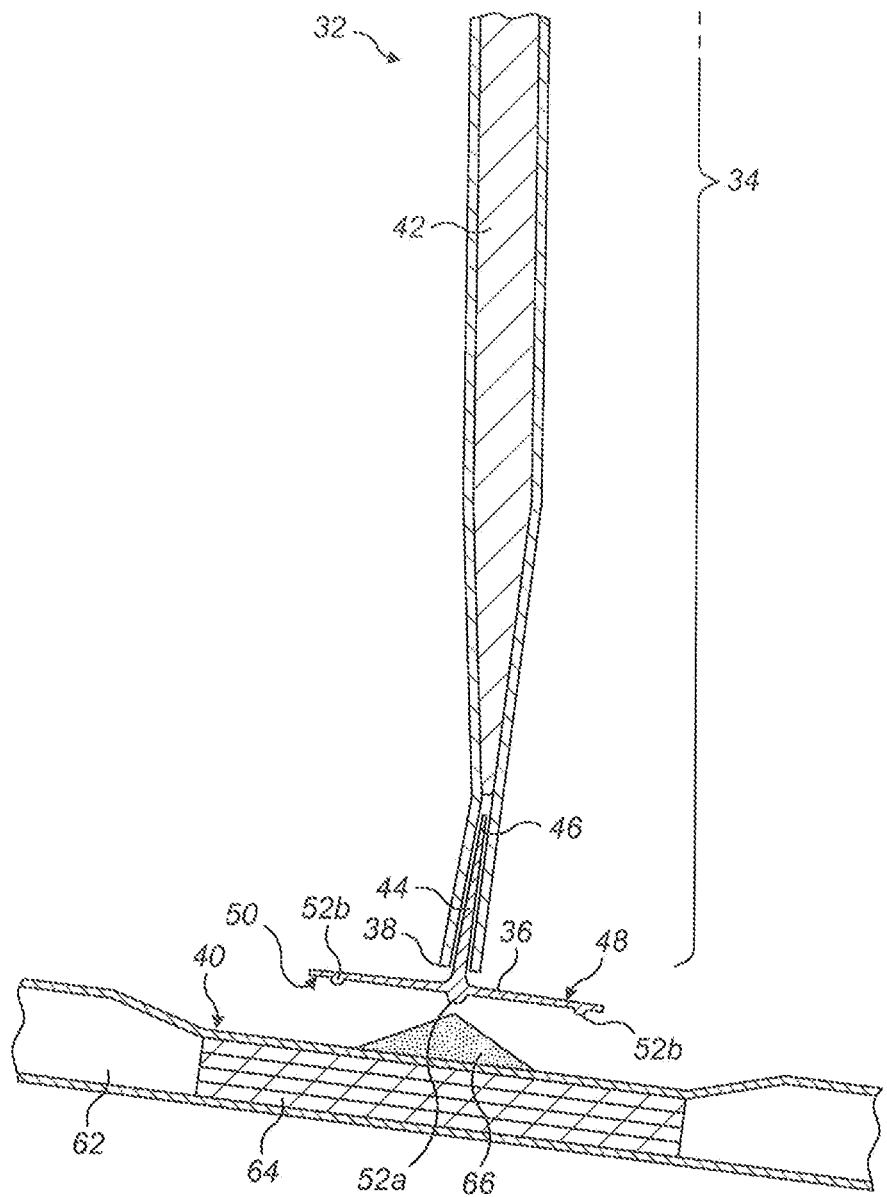
FIGS. 6a and 6b show a process of bonding the shear web to the inner surface of a blade shell.

Referring to FIG. 6a, an end region of the shear web 32 is shown in cross-section, in close proximity to a portion 62 of a blade shell 26. The blade shell portion 62 may be a blade half-shell. As shown in FIG. 6a, the shell portion 62 includes a reinforcing structure or 'spar cap' 64 integrated within the structure of the shell portion 62.

To bond the shear web 32 to the inner surface 40 of the shell portion 62, adhesive 66 may be applied to the inner surface 40 of the shell portion 62 along a longitudinally-extending shear web mounting region. As shown in this example, the shear web mounting region may coincide with the position of the reinforcing spar cap 64. The shear web 32 may then be maneuvered into position such that the bonding surface 50 of the mounting flange 36 is arranged against the adhesive 66, as shown in FIG. 6a.

The shear web 32 and shell portion 62 may be moved relative to one another to bring the bonding surface 50 of the mounting flange 36 closer to the inner surface 40 of the shell portion 62 such that the adhesive 66 is squeezed between the two surfaces 40, 50. The skilled person will appreciate that this relative movement may be provided by pressing the shear web 32 against a stationary shell portion 62. Alternatively, the shear web 32 may be maintained in a stationary position whilst the shell portion 62 is moved towards the shear web 32. In other embodiments, the shear web 32 and shell portion 62 may both be moved, either sequentially or simultaneously.

Figure 6B:
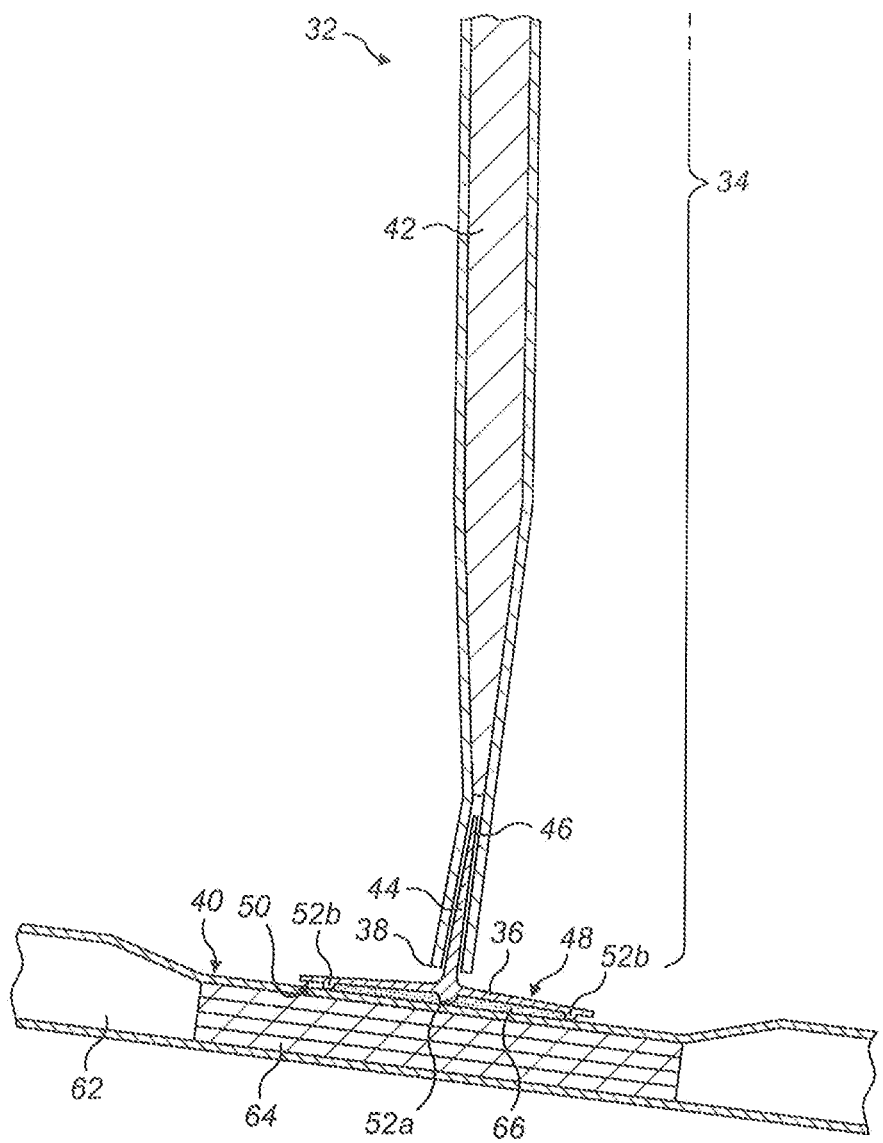

As shown in FIG. 6b, the shear web 32 and shell portion 62 are brought together to compress the adhesive 66 between the mounting flange 36 of the shear web 32 and the inner surface 40 of the shell portion 62. As the mounting flange 36 and shell portion 62 are brought together, the protruding features 52a, 52b may make contact with the inner surface 40 of the shell portion 62. At this point, the shear web 32 and shell portion 62 cannot be brought closer together. Thus, the protruding features 52a, 52b prevent the bonding surface 50 from making contact with the inner surface 40 of the shell portion 62. Therefore, the protruding features 52a, 52b ensure that the bonding surface 50 of the mounting flange 36 is spaced apart from the inner surface 40 of the shell portion 62 by a predetermined minimum distance corresponding to the depth of the protruding features 52a, 52b (2-3 mm in this example). In this regard, the protruding features 52a, 52b function as depth stops and ensure that there is a minimum thickness of adhesive 66 (equal to the depth of the protruding features 52a, 52b) between the bonding surface 50 of the flange 36 and the inner surface 40 of the shell portion 62.

As such, the protruding features 52a, 52b prevent over-compression of the adhesive 66; i.e. they prevent too much adhesive 66 from being squeezed out of the region between the bonding surface 50 of the mounting flange 36 and the inner surface 40 of the shell portion 62. Therefore, the protruding features 52a, 52b ensure sufficient adhesive 66 is present in the bondline between the shell portion 62 and the mounting flange 36 of the shear web 32 and hence ensure a high-quality bond.

During compression, the central region of the mounting flange 36 may experience the most force as the compression force is transferred to the flange 36 from the centrally located upstand 46. The central ridge 52a, being laterally aligned with the upstand 46 relative to the width of the flange 36, is directly opposite the base of the upstand 46. As such, in the orientation of the shear web 32 shown in FIG. 3, the central ridges 52a of the flange structures 44 are respectively located directly above and below the bases of their respective upstands 46. Being aligned with the base of the upstand 46, the central ridge 52a supports the region of the mounting flange 36 that experiences most force during compression. This prevents the mounting flange 36 from flexing during compression which may result in a kissing bond.

Since the cross-section of the protruding features 52a, 52b is constant along the length of the flange structure 44, the minimum thickness of the bondline is ensured along the entire length of the flange structure 44. Furthermore, since the protruding features 52a, 52b comprise a plurality of ridges spaced apart laterally across the width W of the flange 36, the minimum thickness of the bondline is ensured across the width of the flange 36. Therefore, the protruding features 52a, 52b advantageously ensure a consistent high-quality bond between the shear web 32 and the shell portion 62 across the entire bonding surface 50 of the flange 36.

The skilled person will appreciate that the other mounting flange 36 may be bonded to the inner surface 40 of the blade shell 26 by a similar process to the one described above. In some cases, the adhesive 66 may be applied directly to the bonding surface 50 of the mounting flange 36 rather than to the inner surface 40 of the blade shell 26.

The present invention is not limited to the exemplary embodiments described above and many other variations or modifications will be apparent to the skilled person without departing from the scope of the present invention as defined in the following claims.

Figure 7:
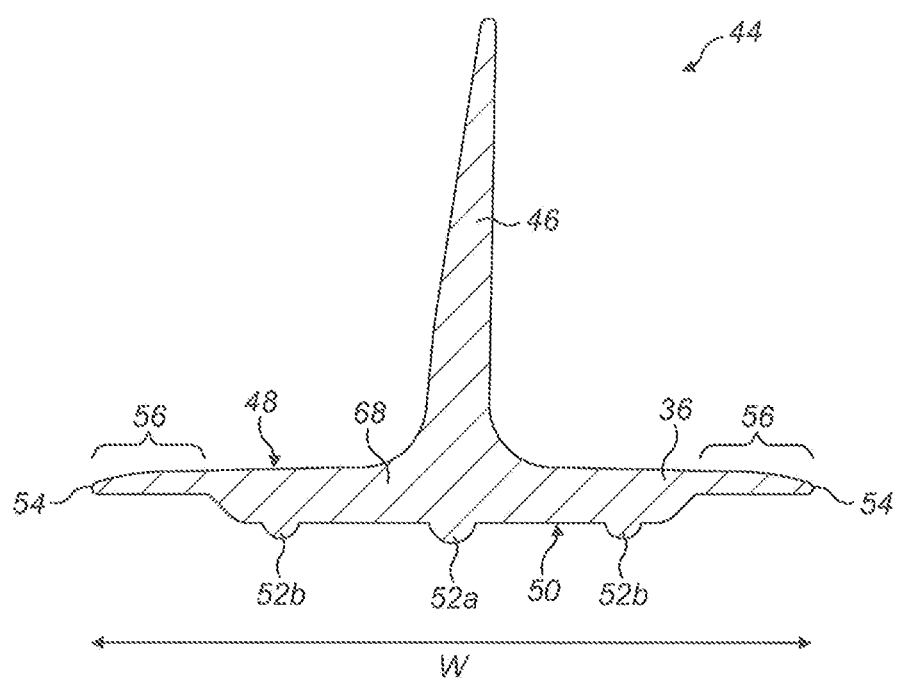
FIG. 7 is a cross-sectional view of a flange structure in accordance with another example of the present invention.

For example, the flange structure 44 may take many other forms. FIG. 7 shows one alternative example of a flange structure 44 in cross-section. Similarly to the flange structure 44 described above, the flange structure 44 shown in FIG. 7 generally comprises a flange 36 and an upstand 46 and is substantially T-shaped in cross-section. The flange 36 may comprise a main portion 68 defining the bonding surface 50 of the flange 36 from which protruding features 52a, 52b in the form of three ridges project. As shown in FIG. 7, the flange 36 may also comprise 'glue-catcher' portions 56 in the form of first and second longitudinal edge regions 56 respectively defining first and second longitudinal edges 54 of the flange 36. In this example, the main portion is located between the glue-catcher portions 56. As shown in FIG. 7, the glue-catcher portions 56 may have reduced thickness relative to the main portion of the flange 36.

The glue-catcher portions 56 are provided to catch any excess adhesive 66 that is squeezed out when the shear web 32 is bonded to the blade shell 26. The reduced thickness of the longitudinal edge regions 56 provides a volume between the inner surface 40 of the blade shell 26 and the glue-catcher portions 56 of the flange structure 44 within which any excess adhesive 66 can collect during compression. The glue-catcher portions 56 advantageously collect any excess adhesive 66 that detaches from the blade shell 26.

In some examples, the upstand 46 may not project perpendicularly from the first surface 48 of the flange 36. As shown in FIG. 7, the upstand 46 may be inclined relative to the first surface 48 of the flange 36. This allows the flange structure 44 to be integrated into the shear web 36 such that the mounting flange 36 defined by the flange structure 44 is arranged at an angle to the web element 34 of the shear web 36. As discussed previously, this may be desirable to accommodate the curvature of the blade shell 26.

Other modifications to the form of the flange structure 44 will be evident to persons skilled in the art depending on the requirements of the shear web 36.

The skilled person will be aware of alternative shear web configurations to which the present invention is applicable. For example, the mounting flanges may be formed integrally with the shear web panel.

The invention claimed is:

1. A wind turbine blade shear web comprising:
   a web panel having first and second edges; and
   first and second flange structures, each flange structure including:
      a flange extending longitudinally and including a bonding surface for bonding to an inner surface of a wind turbine blade, the bonding surface having one or more protruding features configured to extend toward the inner surface of the wind turbine blade;
      wherein the protruding features protrude from the bonding surface by approximately 0.5 to 5 mm; and
      an upstand extending from a surface of the flange opposite the bonding surface of the flange,
   wherein at least a portion of the upstand of the first and second flange structures is positioned inside the web panel at respective first and second edges.

2. The shear web of claim 1, wherein the one or more protruding features are formed integrally with the flange.

3. The shear web of claim 1, wherein the flange is a pultruded component.

4. The shear web of claim 1, wherein the one or more protruding features comprise one or more longitudinally extending ridges.

5. The shear web of claim 4, wherein the one or more ridges extend along the length of the flange.

6. The shear web of claim 4, wherein the one or more ridges are continuous along the length of the flange.

7. The shear web of claim 4, wherein the flange comprises a plurality of ridges that are mutually spaced apart in a lateral direction across the width of the flange.

8. The shear web of claim 4, wherein the flange comprises first and second peripheral ridges that are respectively laterally spaced inwardly of first and second longitudinal edge regions of the flange.

9. The shear web of claim 4, wherein the flange comprises a central ridge located substantially centrally between first and second longitudinal edges of the flange.

10. The shear web of claim 9, wherein the central ridge and the upstand are aligned in a lateral direction.

11. The shear web of claim 1, wherein the flange comprises a main portion defining the bonding surface and first and second longitudinal edge regions defining first and second longitudinal edges of the flange, wherein the first and second longitudinal edge regions have a reduced thickness relative to the thickness of the main portion.

12. The shear web of claim 1, wherein the flange comprises reinforcing fibres in a cured resin matrix.

13. The shear web of claim 12, wherein the protruding features comprise unidirectional reinforcing fibres and a portion of the flange comprises reinforcing fibres oriented in more than one direction.

14. The shear web of claim 1, wherein the shear web comprises a longitudinally extending web panel and the flange is arranged transversely to the web panel.

15. A wind turbine blade comprising a shear web as claimed in claim 1, wherein the flange is bonded to an inner surface of the blade by means of adhesive and the bonding surface of the flange is spaced apart from the inner surface of the blade with a layer of adhesive between the bonding surface of the flange and the inner surface of the blade.

16. The wind turbine blade of claim 15, wherein the one or more protruding features are in contact with the inner surface of the blade.

17. A method of making the shear web as claimed in claim 1, the method comprising forming the shear web flange by:
   providing a pultrusion die defining an aperture having a shape corresponding to a cross-sectional shape of the flange;
   drawing resin-coated fibrous material through the aperture; and
   curing the resin.

18. The method of claim 17, wherein the fibrous material comprises fibrous tape.

19. The method of claim 17 wherein the fibrous material comprises a combination of unidirectional fibres and fibres arranged in more than one direction.

20. A method of making a wind turbine blade comprising:
   providing a shell portion of the wind turbine blade having an inner surface;
   providing a shear web as claimed in claim 1;
   applying adhesive to the inner surface of the shell portion and/or to the bonding surface of the flange of one of the first or second flange structures;
   arranging the bonding surface of the flange opposite the inner surface of the shell; and
   providing relative movement between the shear web and the shell portion such that the adhesive is squeezed between the inner surface of the shell portion and the bonding surface of the flange.

21. The method of claim 20, further comprising continuing to provide said relative movement until the one or more protruding features make contact with the inner surface of the blade shell.

22. A wind turbine blade shear web comprising:
   a flange extending longitudinally and including a bonding surface for bonding to an inner surface of a wind turbine blade, the bonding surface having one or more longitudinally extending peripheral ridges configured to extend toward the inner surface of the wind turbine blade,
   wherein the peripheral ridges protrude from the bonding surface by approximately 0.5 to 5 mm;
   wherein an upstand extends from a surface of the flange opposite the bonding surface of the flange,
   wherein a central ridge is located substantially centrally between first and second longitudinal edges of the flange, and
   wherein the central ridge and the upstand are aligned in a lateral direction.

* * * * *